N. SCHMITT.
GAS STOVE.
APPLICATION FILED MAY 6, 1919.
1,337,413. Patented Apr. 20, 1920.
2 SHEETS—SHEET 2.
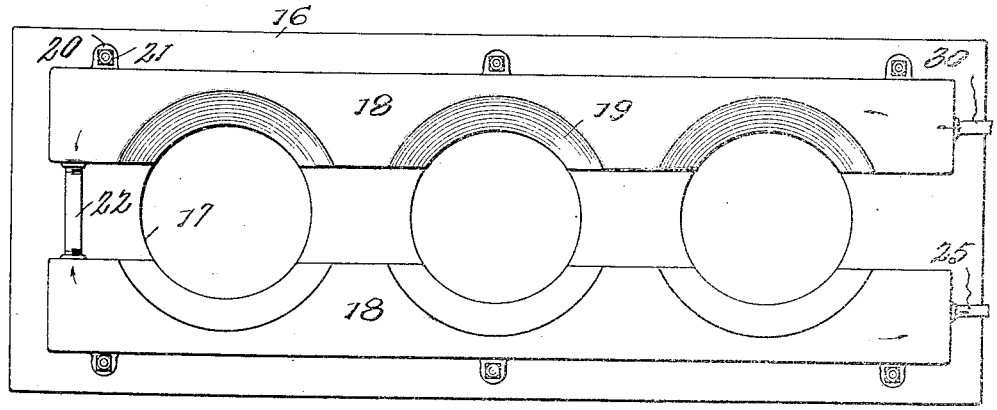
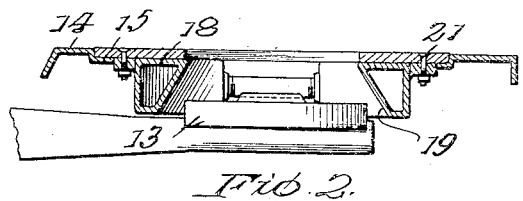
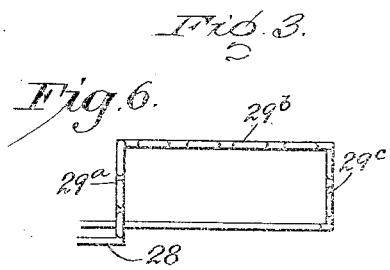
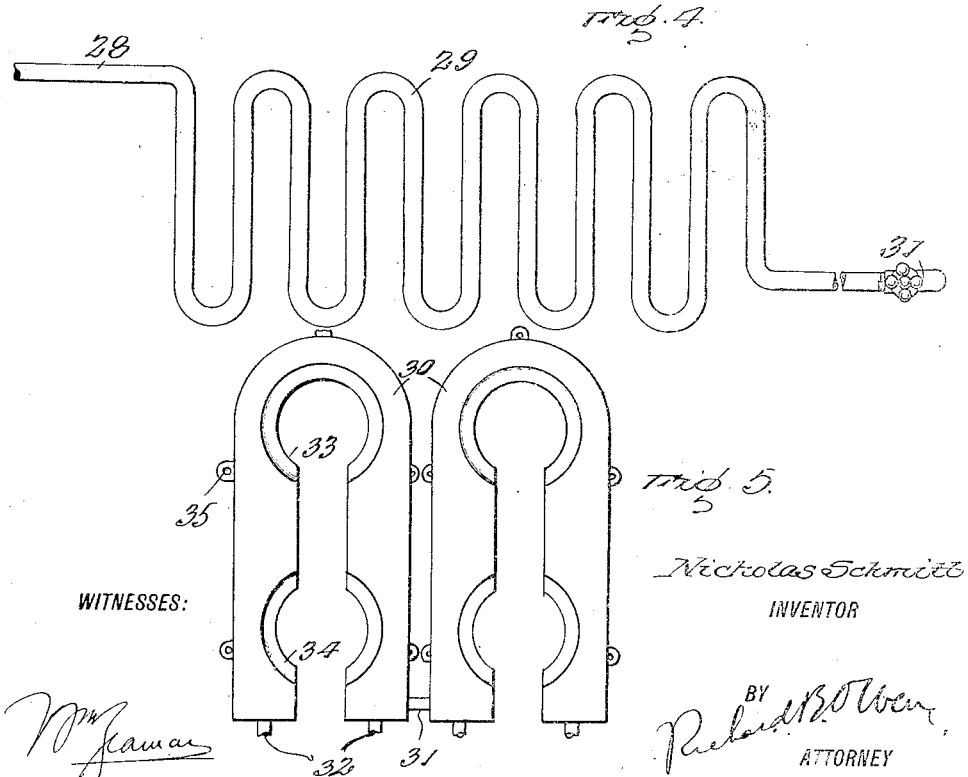
WITNESSES:
Nicholas Schmitt
INVENTOR
BY
Richard B. Owen
ATTORNEY

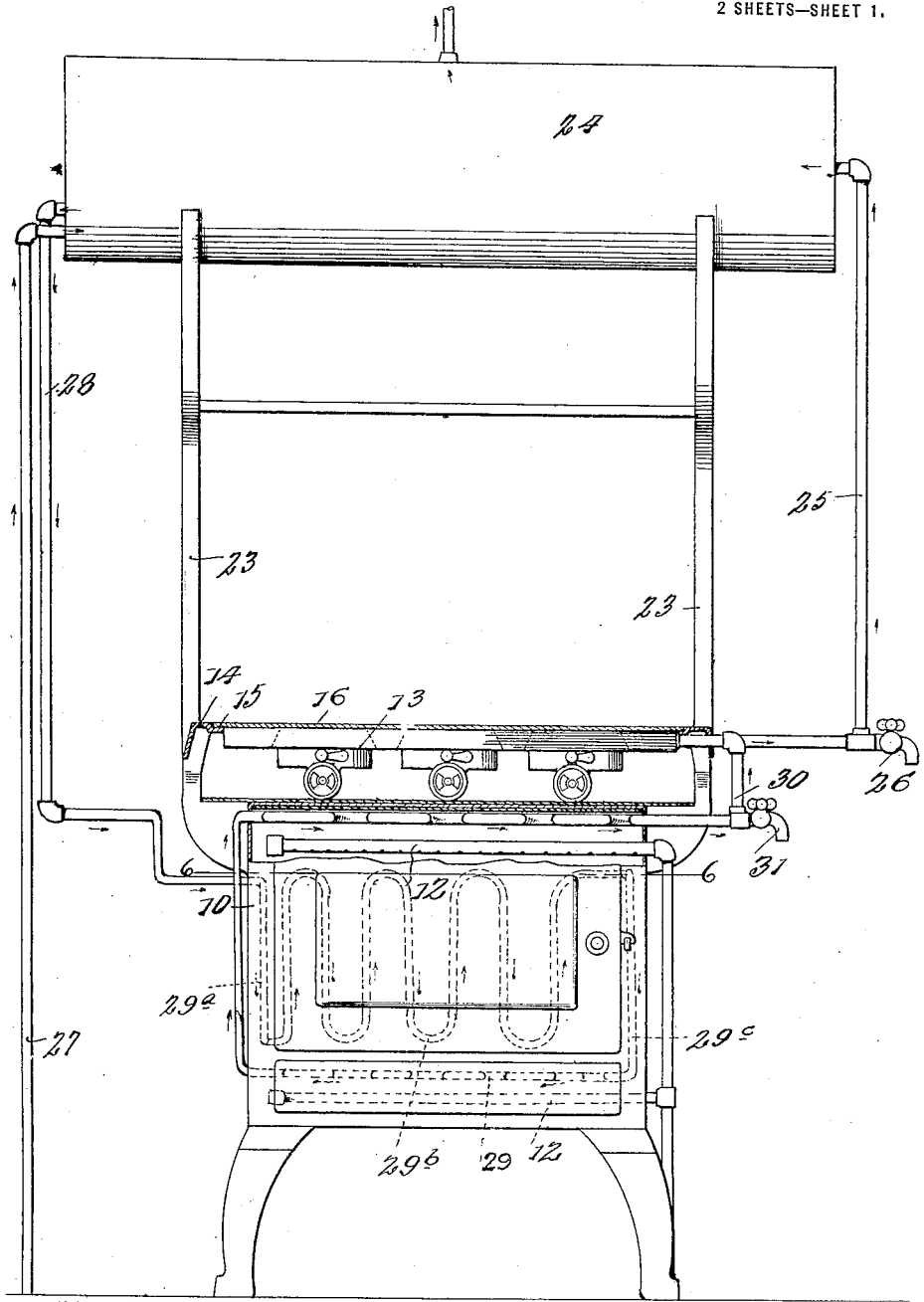

UNITED STATES PATENT OFFICE.

NICHOLAS SCHMITT, OF BROOKLYN, NEW YORK.

GAS-STOVE.

1,337,413.  Specification of Letters Patent.  Patented Apr. 20, 1920.

Application filed May 6, 1919. Serial No. 295,095.

*To all whom it may concern:*

Be it known that I, NICHOLAS SCHMITT, a citizen of the United States, residing at Brooklyn, in the county of Kings and State of New York, have invented certain new and useful Improvements in Gas - Stoves, of which the following is a specification.

This invention has relation to water heaters, with particular reference to a water heater for embodiment in a gas burning stove or the like, and has for its object to provide means located adjacent the cooking burners and also adjacent the oven and broiler burners for utilizing the heat thereof to elevate the temperature of water which is circulated therethrough, the heated water being accumulated in a suitable storage tank.

Another object of the invention is to provide a water heater designed to be superposed above the cooking burners of a gas stove or the like with a view to utilizing the waste heat for elevating the temperature of water, said heater being of a specific formation and design to present a maximum surface and capacity and to insure the proper circulation of water therethrough.

A still further object of the invention is to provide a water heater of a specific type designed to be associated with the broiler and oven burners of a gas stove and to utilize the waste heat therefrom to heat water to be added to the supply of water heated through the medium of the heater described in the foregoing paragraph thereby utilizing to the maximum point of efficiency every available unit of heat for economical and other reasons which will be apparent as the nature of the invention is more clearly understood.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear, Figure 1 is a view in front elevation, with parts broken away illustrating a gas stove having embodied therein my improvements.

Fig. 2 is a transverse section taken through the water heater designed to be located above the cooking burners.

Fig. 3 is a bottom plan view of said water heater.

Fig. 4 is a plan view of the water heater for association with the oven and broiler burners.

Fig. 5 is a bottom plan view of a modified form of water heater for a four burner range.

Fig. 6 is a diagrammatic view in plan taken on the line 6—6 of Fig. 1.

With reference to the drawings, 10 indicates an oven of a conventional form of gas stove and 12 broiler and oven burners, located therein but adjacent the upper and lower ends thereof in the usual manner. The cooking burners are indicated at 13 and are disposed above the oven and beneath a top plate 14 which is formed with a rectangular opening and having the inner margin of said plate around the openings formed with a depressed portion or recess 15. My invention comprises a plate 16 having its edges rested in the recess 15 of the top plate 14 and provided with a plurality of openings 17 which are located directly above the burners 13. Secured to the underside of said plate 16 is a water heater comprising a pair of units 18, each unit being in the form of an oblong container, substantially rectangular in cross section except at point 19 where depressions or recessed portions are formed to encircle the edges of the openings 17 to avoid lapping over of the same. The inner surfaces of the recessed portions 19 are inclined upwardly and toward the center of the openings as shown in Fig. 2 and integrally formed lugs 20 are provided upon the elements 18 to permit the fastening bolts 21 to pass therethrough for supporting the elements from the plate 16. At one end the elements 18 are connected through the medium of a tube 22 for permitting the water to circulate from one element to the other. Uprights 23 are usually provided upon the stove to support a boiler 24, and a pipe 25 is extended from one of the elements 18 and led upward to one end of the boiler, a faucet 26 being provided in the pipe 25 to permit hot water to be drained directly from the heater if desired. At the opposite end the feed pipe 27 enters the boiler, and an outlet pipe 28 is provided therefor which extends downwardly and is connected at its lower end to a water heater shown in detail in Fig. 4 from which it will be noted that the heater comprises a series of undulated coils 29, 29ª, 29ᵇ and 29ᶜ the coil 29 being located above the broiler burner, and the remaining coils around the sides of the oven and above the oven burner, the pipe 28 being connected to the coil 29ª and the coil 29ᶜ to the coil 29. The opposite end of the heater 29 is then connected by means of a pipe 30 to the other element 18 of the water heater described above. A faucet 31 being provided in the connection if desired to permit hot water to be drained directly from the heater 29.

In operation, it will be obvious that circulation of water through the system will be from the boiler down through the pipe 28 into the coils 29ª and 29ᵇ, 29ᶜ, and 29, and should either the broiler or oven burners or both be in operation the water will be heated in passing through the coils and ascend through the vertical portion of the pipe 30 into the heating elements 18 of the upper heater, and thence after passing from one element to the other will effect an exit through the pipe 25 entering the boiler 24 adjacent the upper portion thereof. In the event that one or more of the burners 18 are in operation the water will be quickly heated after leaving the coils 29, 29ª etc. It will also be apparent that if one or more of the burners 13 are in operation while the oven or broiler burners 12 are not in use this heat may be utilized to elevate the temperature of the water in the system. From the foregoing it will be obvious that I have provided means whereby the heat, not only from the cooking burners but also from the oven may be utilized economically to elevate the temperature of water in the system without the expenditure of fuel especially for this purpose. In this manner an economical arrangement is provided since the use of this apparatus does not occasion any loss of heat for use in cooking or other purposes. If desired a portion or all of the interior of the oven or adjacent, the upper portion thereof may be lined with lagging to retain the heat therein. Other uses and advantages will readily occur to those skilled in the art to which this invention appertains.

In Fig. 5 I have shown a modified form of heater for superposition over a four burner cooking range comprising a pair of U-shaped water backs 30 having adjacent terminals connected as at 31. If desired the adjacent terminals may be supplied with couplings 32 to permit the water backs to be used together or separately. Recessed portions 33 and 34 are provided adjacent the ends of the water backs to inclose the burners, and lugs 35 are formed to permit the water backs to be attached to plates in the manner set forth above. In this instance one plate for each water back may be provided thereby permitting one or both water backs to be used on a range as desired. In view of the foregoing it will be seen that this system of water backs may be embodied in any style or size of gas stove or range.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:

1. In combination with a gas stove including superposed broiling and baking burners, and cooking burners superposed above the broiling burners, of three coils disposed at the sides and rear of the oven, said coils being connected in series, a coil mounted above the baking burner and connected in series with one end coil, a coil mounted above the broiling burner connected in series with said last mentioned coil, and a water heater mounted above the cooking burners and connected in series with said last mentioned coil.

2. A water heater comprising a pair of parallel rectangular boxes, means connecting the same at one end to permit circulation of water from one box to the other, the adjacent faces of said boxes being formed with semi-circular depressed portion to encircle the burners of a gas range, and means for supporting said boxes upon the range.

3. A water heater including a plate having a plurality of circular openings therein, a pair of boxes having integrally formed ears, bolts passing through said ears and the plate to support the boxes therefrom, the adjacent faces of said boxes being depressed and beveled to coincide with the edges of the openings, a pipe connecting the boxes at one end, and inlet and outlet pipes connected to the opposite end of said boxes.

4. A water heater including a pair of U-shaped receptacles, means connecting the adjacent terminals of the receptacles to permit circulation of water from one to the other, the adjacent faces of said receptacles and the inner surface of the bight portion being curved and beveled to encircle the burners of a gas range, and inlet and outlet pipes connected to each terminal of each of said receptacles.

In testimony whereof I affix my signature in presence of two witnesses.

NICHOLAS SCHMITT.

Witnesses:
 WM. ZEAMAN,
 G. PETRINO.